United States Patent [19]
Carlson et al.

[11] Patent Number: 5,214,106
[45] Date of Patent: May 25, 1993

[54] CURED FLUOROELASTOMER COMPOSITIONS

[75] Inventors: Dana P. Carlson, Chadds Ford, Pa.; Akira Nagasawa, Kawasaki, Japan

[73] Assignee: E. I. Du Pont de Nemours and Company, Wilmington, Del.

[21] Appl. No.: 704,269

[22] Filed: May 22, 1991

[51] Int. Cl.$^5$ .................. C08F 14/22; C08F 259/08
[52] U.S. Cl. ............................. 525/263; 525/276; 525/326.3
[58] Field of Search .............. 525/326.3, 276, 263

[56] References Cited

U.S. PATENT DOCUMENTS

| | | | |
|---|---|---|---|
| 4,035,565 | 7/1977 | Apotheker et al. | 526/249 |
| 4,158,678 | 6/1979 | Tatemoto et al. | 260/884 |
| 4,243,770 | 1/1991 | Tatemoto et al. | 525/331 |
| 4,564,662 | 6/1986 | Albin | 526/247 |
| 4,694,045 | 9/1987 | Moore | 525/276 |
| 4,748,223 | 5/1988 | Haruyoshi et al. | 526/206 |
| 4,973,633 | 11/1990 | Moore | 526/247 |

Primary Examiner—Carman J. Seccuro, Jr.

[57] ABSTRACT

Fluoroelastomer compositions with terminal iodo groups and having improved low temperature properties in the cured state.

8 Claims, No Drawings

CURED FLUOROELASTOMER COMPOSITIONS

BACKGROUND OF THE INVENTION

Fluoroelastomers based on vinylidene fluoride ($VF_2$), such as copolymers with hexafluoropropylene (HFP) and tetrafluoroethylene (TFE), are well-known materials which have a unique combination of properties. Their high chemical, thermal and oxidative stability give them high value in the marketplace. While these elastomers have many desirable properties, their low temperature flexibility is not adequate for all low temperature applications.

There has been considerable effort to improve the low temperature flexibility of these elastomers. It is known that the low temperature flexibility, as measured by the glass transition temperature ($T_g$), of $VF_2$/HFP/TFE copolymers varies inversely with the $VF_2$ content of the copolymer. However, increasing the $VF_2$ content of these copolymers is not always desirable, since their chemical resistance becomes poorer as the $VF_2$ content is raised.

Another method for improving the low temperature flexibility of $VF_2$ elastomers is to substitute perfluoro(alkyl vinyl ethers) for the HFP in $VF_2$/HFP/TFE copolymers. For example, when perfluoro(methyl vinyl ether) (PMVE) is substituted for HFP, the resulting $VF_2$/PMVE/TFE copolymers have $T_g$'s which are 10° to 20° C. lower than those of the corresponding $VF_2$/HFP/TFE copolymers. While this is a good method for improving the low temperature flexibility of $VF_2$ fluoroelastomers, the cost of copolymers containing perfluoro (alkyl vinyl ethers) is much higher than that of conventional $VF_2$/HFP/TFE copolymers.

SUMMARY OF THE INVENTION

The present invention provides a method of improving the low temperature properties of both $VF_2$/HFP/TFE and $VF_2$/PMVE/TFE copolymers, without depreciation of the other beneficial properties of these copolymers.

Specifically, the present invention provides a cured fluoroelastomer composition prepared from (A) a polymer selected from (1) a random copolymer of about 60–80 mole % vinylidene fluoride polymer repeat units, about 14–24 mole % hexafluoropropylene polymer repeat units and about 4–26 mole % tetrafluoroethylene polymer repeat units, and (2) a random copolymer of about 46–83 mole % $VF_2$ polymer repeat units, about 12–24 mole % $CF_3(CF_2)_nOCF=CF_2$ polymer repeat units wherein n is 0–5, and up to about 30 mole % tetrafluoroethylene polymer repeat units, wherein at least about 75% of the terminal carbon atoms have iodine bonded thereto and the iodine comprises about from 0.1 to 0.5 weight percent of the polymer; and (B) a curing system comprising (1) about from 0.5 to 10 parts, per 100 parts of polymer, of a polyfunctional crosslinking agent, and (2) about from 0.5 to 10 parts, per 100 parts of polymer of an organic peroxide.

The present invention further provides a process for the preparation of cured fluoroelastomer comprising blending (A) a polymer selected from (1) a copolymer of about 60–80 mole % vinylidene fluoride polymer repeat units, about 14–24 mole % hexafluoropropylene polymer repeat units and about 4–26 mole % tetrafluoroethylene polymer repeat units, and (2) a copolymer of about 46–83 mole % polymer repeat units, about 12–24 mole % $CF_3(CF_2)_nOCF=CF_2$ polymer repeat units wherein n is 0–5, and up to about 30 mole % tetrafluoroethylene polymer repeat units, wherein at least about 75% of the terminal carbon atoms have iodine bonded thereto; and (B) a curing system comprising (1) about from 0.5 to 10 parts, per 100 parts of polymer, of a polyfunctional crosslinking agent, and (2) about from 0.5 to 10 parts, per 100 parts of polymer of an organic peroxide; and heating the resulting blend to a temperature of about from 150° to 200° C. for a period of at least about one minute.

DETAILED DESCRIPTION OF THE INVENTION

The present invention is based on the discovery that certain $VF_2$ copolymers having iodo end groups, cured with peroxide and polyfunctional crosslinking agent, have surprisingly improved low temperature properties relative to the same polymers cured with bisphenols or diamines.

The general class of polymers to which the present invention relates, that is, $VF_2$ copolymers containing iodo end groups, is described in Tatemoto et al., U.S. Pat. No. 4,243,770, which is hereby incorporated by reference.

The polymers used in the present invention are prepared using a semi-batch, emulsion polymerization process which is carried out in the presence of an iodine chain transfer reagent of the formula RI2, where R is a saturated perfluorocarbon or chlorofluorocarbon alkylene group of at least three carbon atoms so that the two iodine moities are separated by at least three carbon atoms. It has now been found that when the two iodine moities are separated by less than three carbon atoms, as in 1,2 diiodoperfluoroethane, the diiodide reagent inhibits the polymerization process.

Representative diiodide reagents which can be used in the preparation of the random copolymers used in this invention are 1,3 diiodoperfluoropropane, 1,4 diiodoperfluorobutane, 1,3 diiodo-2-chloroperfluoropropane, 1,5 diiodo-2,4-dichloroperfluoropentane, 1,6 diiodoperfluorohexane, 1,8 diiodoperfluorooctane, 1,12 diiodoperfluorododecane, and 1,16 diiodoperflurohexadecane. These reagents can be used either by themselves or in combination with each other. A preferred reagent is 1,4 diiodoperfluorobutane.

In the preparation of the random copolymers used in the present invention, the initiators for the chain transfer polymerizations are the same as used in conventional fluoroelastomer polymerizations. These include organic and inorganic peroxides as well as azocompounds. Typical initiators include persulfates, peroxycarbonates, peroxyesters and the like. A preferred initiator is ammonium persulfate (APS). APS can either be used by itself or in combination with reducing agents such as sulfites. The amount of initiator added to the polymerization is set by the amount of iodide reagent charged, in order to maintain the desired iodide/initiator ratio.

The mole ratio of iodide chain transfer agent to initiator is generally about from 3/1 to 20/1, and preferably at least about 4/1. Higher ratios than 20/1 are not necessary and may be undesirable because of the resulting low rate of polymerization. Ratios above about 3/1 give polymers with 75% or more of the end groups containing iodine.

The amount of iodide reagent used in the polymerization depends on the molecular weight desired as well as the amount of polymer produced. For the copolymers used in the present invention, the iodine concentration in the polymer can vary about from 0.1 to 0.5%, and preferably about from 0.2 to 0.3%. The amount of polymer in the aqueous dispersion can vary, but generally should be in the range of about from 5 to 30% solids, and preferably about from 15 to 25%. Below about 15% solids, the polymer is difficult to recover from the emulsion. Above about 25% solids, agglomeration in the autoclave can occur, leading to inhomogeneous copolymer products.

A wide variety of emulsifiers can be used in the preparation of the copolymers. Salts of long chain fluorocarbon acids are preferred. A typical fluorocarbon emulsifier which can be used in the copolymer preparation is ammonium perfluorooctanoate, commercially available from 3M as FC-143. The amount of emulsifier or dispersing agent used will depend upon the surface active effect of the particular agent being used. When FC-143 is used, the preferred amount is about from 0.1 to 0.5%, and especially about 0.2%, of the aqueous charge.

The temperature of the polymerization in the present invention can vary widely, depending upon the nature of the initiator used and the particular copolymers being prepared. In general, temperatures of about from 25° to 100° C. are used. However, with APS initiator, a temperature of about from 70° to 90° C. is preferred, and 80° C. has been found to be particularly satisfactory. Higher temperatures can be used, in some cases, but undesirable side reactions such as branching and monomer rearrangements (e.g., rearrangement of perfluoroalkylvinyl ether to acid fluoride) can occur. Temperatures below about 25° C. typically result in undesirably slow reaction rates.

The polymerization pressure used will depend upon the vapor pressure of the monomers needed to sustain a polymerization rate of about from 3 to 30 g/liter-hour, and preferably about from 10 to 15 g/liter-hour. Below the desired rate, copolymers with the desired molecular weight either cannot be prepared at all or the time required is too long to be practical. At higher than the specified rate of polymerization, undesired coupling reactions can occur which lead to broad molecular weight distributions and poor processing properties. If the temperature and iodide/initiator ratio are in the desired ranges specified above, polymers can readily be prepared at pressures of about 200 psig (1.4 MPa) or lower.

In accordance with the present invention, to achieve improved low temperature properties, the copolymers are cured by blending with an organic peroxide and a polyfunctional crosslinking agent.

The organic peroxide should be present in an amount of about from 0.5 to 10 parts, per 100 parts of copolymer. A wide variety of organic peroxides can be used, including, for example, dialkyl peroxides such as di-tertiarybutyl peroxide having a tertiary carbon atom attached to a peroxy oxygen. Preferred peroxides of this type are 2,5-dimethyl-2,5-di(tertiarybutylperoxy)hexyne-3 and 2,5-dimethyl-2,5-di(tertiarybutylperoxy)hexane. Still other organic peroxides which can be used include dicumyl peroxide, dibenzoyl peroxide, tertiarybutyl perbenzoate, and di[1,3-dimethyl-3-(t-butylperoxy)butyl]carbonate. When a composition is to be processed at elevated temperatures before it is cured, it is desirable to have a peroxide which decomposes at a temperature above about 50° C. One organic peroxide that has been found to be particularly satisfactory is 2,5-dimethyl-2,5-di (tertiarybutylperoxy)hexane.

The polyfunctional crosslinking agent should similarly be present in an amount of about from 0.5 to 10 parts, per 100 parts of copolymer, and preferably about 1-7%. A wide variety of such crosslinking agents can be used in the present invention, such as triallyl cyanurate; triallyl isocyanurate; tris(diallylamine-s-triazine); triallyl phosphite; N,N-diallyl acrylamine; hexaallyl phosphoramide; N,N,N',N'-tetraallyl tetraphthalamide; N,N,N',N'-tetraallyl malonamide; trivinyl isocyanurate; 2,4,6-trivinyl methyltrisiloxane; and tri(5-norbornene-2-methylene) cyanurate. Of these, triallyl isocyanurate has been found to be particularly satisfactory, and is accordingly preferred.

The blended polymer and curing system is generally cured by heating to a temperature of about 150° to 200° C. Normally, the curing reaction is carried out at a temperature of about from 160° to 180° C. where the mixture is held under pressure (press cure) for a period of about from 1 to 30 minutes. The time necessary for the press cure will depend on the temperature and amount of curing reagents used. Although normally not necessary, the polymer can be post cured following the press cure at a temperature of about from 180° to 200° C. for about from 1 to 4 hours. Longer times or higher temperatures are not necessary and may even be detrimental to the desirable low temperature properties which are otherwise realized through the present invention.

The fluoroelastomer compositions of this invention can also be mixed with fillers such as carbon black and other ingredients, if desired, using either conventional milling procedures or internal mixers. Because of the excellent flow characteristics of these mixtures, processing by either extrusion or injection molding techniques can readily be carried out. Also, conventional elastomer processing techniques such as compression and transfer molding can be used.

The cured fluoroelastomer compositions of the present invention exhibit excellent low temperature properties. Specifically, these cured fluoroelastomers, cured with peroxide and polyfunctional crosslinking agent, have surprisingly improved low temperature properties relative to the same polymers cured with bisphenols or diamines. In addition, the low temperature properties of the present cured fluoroelastomers are superior to peroxide cured polymers with the same composition but containing cure site monomers of the type described in Apotheker et al., U.S. Pat. No. 4,035,565.

The improvement in low temperature performance is usually about 5 to 6 centigrade degrees. That is, polymers prepared and cured according to the instant invention, retain their flexibility to temperatures about 5 to 6 degrees below the temperatures at which equivalent compositions, cured by other methods, lose their flexibility.

The present invention is further illustrated by the following specific examples, in which parts and percentages are by weight unless otherwise indicated. Mole percentages are indicated as m %. In these Examples, several polymers were first prepared, including those falling within the scope of the present invention as well as those differing from the present invention by having bromo- cure sites instead of the required iodo- cure sites.

POLYMER 1

A VF$_2$ polymer was prepared as follows. A 38 liter stainless autoclave was evacuated and purged with nitrogen and then was charged with 26 liters of deionized, deoxygenated water in which was dissolved 56 g. of FC-143 surfactant. The reactor was then pressured to about 0.2 MPa (30 psi) with a start-up monomer mixture which had the following composition: 44 m % VF$_2$, 48 m % HFP, and 8 m % TFE. The autoclave was vented off to about 0.03 MPa (5 psi). The pressuring and venting was repeated 2 more times. The autoclave was then heated to 80° C. while stirring at 75 RPM. The autoclave was then pressured to 1.35 MPa (195 psi) with the start-up monomer mixture described above. To start the polymerization, the autoclave was charged with 40 ml of a 1% solution of APS in H$_2$O. At this time, 36 g of 1,4 diiodoperfluorobutane, dissolved in 36 ml of 1,1,2 trichloro 1,2,2 trifluoroethane, was added. The autoclave was then pressured to 1.38 MPa (200 psi) with the start-up monomer. The pressure was maintained at 1.38 MPa. by constant addition of a make-up monomer mixture of the following composition: 65 m % VF$_2$, 17 m % HFP, and 18 m % TFE. During the course of the 18 hour polymerization, a total of about 8.2 kg. of make-up monomer was added at a maximum rate of about 0.5 kg./hr. During the same period, an additional 85 ml. of 1% APS solution was added continuously at rates ranging between 0.5 to 3 ml./hr. Thus, the mole ratio of iodide to total APS in this run was 14.5.

The polymerization autoclave was then cooled to about 40° C., the unreacted monomers were vented off and the polymer emulsion was then discharged from the reactor. The polymer emulsion weighed 34.59 kg. and contained 24.2% solids. The fluoroelastomer was isolated from the emulsion by coagulating with saturated potassium aluminum sulfate solution. The coagulated polymer was allowed to settle and then was separated from the supernate by filtration. The polymer was then washed 3 times by high speed stirring in a large stainless steel tank. Finally, the wet crumb was spread out in shallow stainless steel trays and dried in a circulating air oven at 75° C. for about 48 hours. The dry, colorless polymer slabs were removed from the trays and stored in polyethylene bags. The weight of dry polymer recovered from the emulsion totaled 8.34 kg. The composition of the fluoroelastomer was determined to be as follows: 66.3 m % VF$_2$, 16.9 m % HFP and 16.7 m % TFE. The polymer contained 0.23 wt. % iodine. The Mooney viscosity, ML-10, measured at 121° C., was 17.0.

POLYMER 2

A copolymer was prepared according to the general procedures used for Polymer 1, except that the start-up monomer mixture had the following composition: 39 m % VF$_2$, 40 m % PMVE, and 21 m % TFE. The make-up monomer mixture had the composition as follows: 54 m % VF$_2$, 22 m % PMVE, and 24 m % TFE. The autoclave pressure was 1.14 MPa.(165 psi) and the total polymerization time was 22 hrs. The mole ratio of iodide to total APS was 10.8. The polymer emulsion weighed 32.70 kg. and the solids content was 25.0 wt %. The recovered, dried polymer weighed 8.12 kg. The composition of the fluoroelastomer was as follows: 54.1 m % VF$_2$, 22.1 m % PMVE, and 23.8 m % TFE. The iodine content of the polymer was 0.24 wt %. The Mooney viscosity, ML-10 (121° C.), was 18.0.

POLYMER 3

A copolymer was prepared according to the general procedures used for Polymer 1, except that the start-up monomer mixture had the following composition: 52 m % VF$_2$, 34 m % PMVE, and 14 m % TFE. The make-up monomer mixture had the composition as follows: 73 m % VF$_2$, 18 m % PMVE, and 9 m % TFE. The autoclave pressure was 1.14 MPa.(165 psi) and the total polymerization time was 18 hrs. The mole ratio of iodide to total APS was 18.0. The polymer emulsion weighed 33.25 kg. and the solids content was 26.0 wt %. The recovered, dried polymer weighed 8.70 kg. The composition of the fluoroelastomer was as follows: 73.8 m % VF$_2$, 17.9 m % PMVE, and 8.3 m % TFE. The iodine content of the polymer was 0.23 wt %. The Mooney viscosity, ML-10 (121° C.), was 16.0.

POLYMER 4

A copolymer was prepared according to the general procedures used for Polymer 1, except that the autoclave was charged with 28 liters of water in which was dissolved 60 g. of FC-143 surfactant. The start-up monomer mixture had the following composition: 45 m % VF$_2$ and 55 m % HFP. The make-up monomer mixture had the composition as follows: 78 m % VF$_2$, 16 m % HFP, and 6 m % TFE. The diiodide reagent was a mixture of diiodides of the formula I(CF$_2$CF$_2$)$_n$I (where n=2,3,4,5 & 6; I=50 wt %.) The amount of these mixed iodides added (neat) was 50 g. The polymerization was started by adding 40 ml. of a 1.25 % APS solution. The autoclave pressure was 1.72 MPa (250 psi) and the total polymerization time was 22 hrs. A total of 9.34 kg of the make-up monomer mixture was charged during the run at a maximum rate of about 0.6 kg./hr. The mole ratio of iodide to total APS was 8.8. The polymer emulsion weighed 37.34 kg. and the solids content was 25.1 wt %. The recovered, dried polymer weighed 9.37 kg. The composition of the fluoroelastomer was as follows: 78.3 m % VF$_2$, 16.1 m % HFP, and 5.7 m % TFE. The iodine content of the polymer was 0.21 wt %. The Mooney viscosity, ML-10 (121° C.), was 20.0.

COMPARATIVE POLYMER A

A continuous, emulsion copolymerization of VF$_2$, HFP, TFE and 4-bromo-3,3,4,4-tetrafluorobutene-1 (BTFB) was carried out in a well-stirred, 4.0 liter stainless steel reactor. The reactor was filled with an aqueous solution containing about 0.7 g APS, 0.2 g NaOH and 0.9 g FC-143 per liter of deionized water. The reactor was heated to 108° C. and the aqueous solution was fed at a rate of 6 liter/hr. The reactor was maintained liquid full by maintaining the pressure at 6.2 MPa (900 psi) by means of back-pressure control valve in the effluent line. To the reactor was then fed about 1550 g/hr. of a gaseous monomer mixture (by means of a diaphragm compressor) with the following composition: 64 m % VF$_2$, 20 m % HFP and 16 m % TFE. After about 15 minutes, 25 g/hr of BTFB was also continuously pumped into the reactor. After the polymerization had been proceeding about 1.5 hours under these conditions, the effluent emulsion was collected for about 5.0 hours. The polymer emulsion, which was collected, weighed about 36.4 kg and contained 19.2% solids. The polymer was isolated, washed and dried under conditions described in example 1. The recovered, dry polymer weighed about 7.0 kg. The composition of the polymer was as follows: 67.9 m % VF$_2$, 15.7 m % HFP, 15.7 m % TFE, and 0.75 m % BTFB. The Mooney viscosity, ML-10 (121° C.), was 96.

COMPARATIVE POLYMER B

The general procedure used for the preparation of Comparative Polymer A was repeated, except as follows: The aqueous feed to the reactor contained 0.8 g/l APS, 0.3 g/l NaOH and 0.5 g/hr FC-143. The aqueous mixture was fed to the reactor at 10 liter/hr rate. The polymerization temperature was 110° C. and about 2500 g/hr. of gaseous monomers was fed to the reactor. The monomer feed had the composition 50 m % VF$_2$, 25 m % PMVE, and 25 m % TFE. The feed rate of BTFB was 39 g/hr. After 2 hours, the effluent emulsion was collected for 6.0 hours during which time about 73 kg was collected. The emulsion contained 18.6% solids. The recovered, dry polymer weighed about 13.6 kg and had the composition as follows: 52.0 m % VF$_2$, 22.0 m % PMVE, 24.2 m % TFE, and 0.8 m % BTFB. The Mooney viscosity, ML-10 (121° C.), was 96.

COMPARATIVE POLYMER C

The general procedure used for the preparation of Comparative Polymer A was repeated, except as follows: The aqueous feed to the reactor contained 0.6 g/l APS and 0.1 g/l NaOH. The polymerization temperature was 105° C. and about 2660 g/hr of gaseous monomers was fed to the reactor. The monomer feed had the composition 73 m % VF$_2$, 19 m % PMVE, and 8 m % TFE. The feed rate of BTFB was 30 g/hr. After 2 hours, the effluent emulsion was collected for 6 hours during which time about 75 kg was collected. The emulsion contained 20.7% solids. The recovered, dry polymer weighed about 15.6 kg and had the composition as follows: 73.4% VF$_2$, 18.6% PMVE, 7.4 m % TFE, and 0.5 m % BTFB. The Mooney viscosity, ML-10 (121° C.), was 76.

EXAMPLES 1-4 and COMPARATIVE EXAMPLES A-G

The fluoroelastomers were mixed with fillers and curatives on a 2-roll rubber mill whose rolls were at a temperature of about 25° C. After thorough blending of the compounds on the mill, the rubber stocks were formed into sheets about 3 mm in thickness. These sheets were press cured at 177° C. for 10 min. at a mold pressure of about 4 MPa. Some of the sheets were then post cured under either of two conditions: The peroxy cured, iodo polymer compounds were post cured at 180° C. for 2 hours. All of the other compounds were post cured at 232° C. for 24 hrs.

The resulting cured fluoroelastomers were evaluated. The modulus at 100% elongation (T$_{100}$), tensile strength (TB) and elongation at break (EB) values were obtained at room temperature on press cured and post cured specimens by ASTM Method D-412.

Compression set values on O-rings were obtained by ASTM Method D-395-61.

Gehman modulus measurements were made on both press and post cured specimens according to ASTM D-1053-89 a. Two values were recorded: The T$_{100}$ value, which is the temperature at which 100% greater torque is necessary to twist the sample specimen than the original torque (at 23° C.). The "freezing point", f.pt., was also indicated.

The details of the formulations and the test results are summarized in the following Tables. In those Tables, VC-50 is a bis-phenol AF salt curing agent; DIAK 1 is a diamine curing agent; DIAK 7 is triallyl isocyanurate all commercially available from the Du Pont Company; and PERHEXA-25-B-40-3 is 40% 2,5-dimethyl-2,5-di(-tertiarybutylperoxy)hexane on an inert carrier, commercially available from Nippon Oils and Fats Company, Ltd.; M$_g$O #30 and M$_g$O #150 are, respectively, low and high activity forms of magnesium oxide, commercially available from Kyowa Chemical Company, Ltd.; and MT Black is a non-reinforcing black commercially available from Can-Carb Company of Canada.

TABLE I

| Example | 1 | A | B | C | D |
|---|---|---|---|---|---|
| COMPOUND | | | | | |
| Polymer | 1 | 1 | 1 | A | C |
| Amount | 100 | 98 | 100 | 100 | 100 |
| MT Black | 30 | 30 | 25 | 30 | 30 |
| VC-50 | — | 2 | — | — | 2 |
| DIAK 1 | — | — | 1.5 | — | — |
| DIAK 7 | 4 | — | — | 3 | — |
| PERHEXA-25-B-40-3 | 3 | — | — | 3 | — |
| Ca(OH)2 | — | 6 | — | 3 | 6 |
| MgO #30 | — | — | 15 | — | — |
| MgO #150 | — | 3 | — | — | 3 |
| ODR - 177° C. | | | | | |
| Mh - Ml, Nm | 5.6 | 2.9 | 3.9 | 3.4 | 4.5 |
| Ts2, min. | 1.1 | 4.0 | 1.1 | 1.4 | 5.5 |
| Tc90, min. | 2.3 | 6.7 | 5.9 | 5.3 | 11.0 |
| PRESS CURE, 177° C./10 min. (except Example C, 177° C./15 min.) | | | | | |
| Tensile Properties | | | | | |
| T100, kg/cm$^2$ | 33 | 35 | 59 | 59 | 57 |
| TB, kg/cm$^2$ | 195 | 77 | 130 | 179 | 131 |
| EB, % | 290 | 330 | 180 | 250 | 290 |
| Compression Set, % 200° C./70 Hr | 28 | — | — | 57 | — |
| Gehman Torsion Test | | | | | |
| T$_{100}$, °C. | −24.1 | −21.5 | −21.6 | −22.8 | −19.3 |
| f. pt., °C. | −23.6 | −19.2 | −20.5 | −21.7 | −18.5 |
| POST CURE, 232° C./24 Hr. (except Example 1, 180° C./2 Hr.) | | | | | |
| Tensile Properties | | | | | |
| T100, kg/cm$^2$ | 25 | 48 | 57 | 74 | 58 |
| TB, kg/cm$^2$ | 218 | 89 | 114 | 247 | 130 |
| EB, % | 400 | 260 | 170 | 210 | 210 |
| Compression Set, % 200° C./70 Hr | 29 | — | — | 29 | — |
| Gehman Torsion Test | | | | | |
| T$_{100}$, °C. | −23.4 | −21.7 | −19.2 | −18.4 | −18.1 |
| f. pt., °C. | −22.8 | −19.1 | −18.9 | −17.8 | −17.5 |

TABLE II

| Example | 2 | E | 3 | F | 4 | G |
|---|---|---|---|---|---|---|
| COMPOSITION | | | | | | |
| Polymer | 2 | B | 3 | C | 4 | 4 |
| Amount | 100 | 100 | 100 | 100 | 100 | 98 |
| MT Black | 30 | 30 | 30 | 30 | 30 | 30 |

TABLE II-continued

| Example | 2 | E | 3 | F | 4 | G |
|---|---|---|---|---|---|---|
| VC-50 | — | — | — | — | — | 2 |
| DIAK 1 | — | — | — | — | — | — |
| DIAK 7 | 4 | 3 | 4 | 3 | 4 | — |
| PERHEXA-25-B-40-3 | 3 | 3 | 3 | 3 | 3 | — |
| Ca(OH)2 | — | 3 | — | 3 | — | 6 |
| MgO #30 | — | — | — | — | — | — |
| MgO #150 | — | — | — | — | — | 3 |
| ODR - 177° C. | | | | | | |
| Mh - Ml, Nm | 5.8 | 3.9 | 5.0 | 3.7 | 5.1 | 3.8 |
| Ts2, min. | 0.9 | 1.1 | 1.0 | 1.2 | 1.1 | 2.0 |
| Tc90, min. | 1.6 | 4.7 | 1.8 | 4.2 | 2.3 | 3.0 |
| PRESS CURE, 177° C./10 min. | | | | | | |
| Tensile Properties | | | | | | |
| T100, kg/cm$^2$ | 29 | 67 | 21 | 55 | 28 | 40 |
| TB, kg/cm$^2$ | 162 | 145 | 159 | 188 | 174 | 92 |
| EB, % | 270 | 170 | 320 | 220 | 300 | 290 |
| Compression Set, % 200° C./70 Hr | 26 | 63 | 29 | 50 | 29 | — |
| Gehman Torsion Test | | | | | | |
| T$_{100}$, °C. | — | — | — | — | −28.3 | −24.0 |
| f. pt., °C. | — | — | — | — | −28.2 | −23.7 |
| POST CURE, 232° C./24 Hr. (except Examples 3, 4, & 5: 180° C./2 Hr.) | | | | | | |
| Tensile Properties | | | | | | |
| T100, kg/cm$^2$ | 31 | 92 | 21 | 70 | 26 | 56 |
| TB, kg/cm$^2$ | 178 | 197 | 184 | 218 | 219 | 125 |
| EB, % | 270 | 160 | 330 | 190 | 370 | 200 |
| Compression Set, % 200° C./70 Hr | 23 | 40 | 30 | 30 | 25 | — |
| Gehman Torsion Test | | | | | | |
| T$_{100}$, °C. | −29.6 | −27.6 | −34.8 | −32.9 | −28.5 | −23.9 |
| f. pt., °C. | −29.0 | −25.7 | −34.7 | −32.2 | −28.2 | −23.6 |

Example 1 and Comparative Examples A & B illustrate the effect of different cure systems on the same iodo polymer. The peroxy cure system of the present invention, used in Example 1, gives significantly better low temperature properties than either the bisphenol or the diamine cure systems. Similarly, comparing the above examples with Comparative Examples D & E illustrate the unique property of the peroxide cure on the iodo polymer. The polymer used in the Comparative Examples D & E has the same composition as the iodo polymer of Example 1, except that it contains bromo cure site monomer instead of the iodo moiety. The peroxy cured iodo polymer gives significantly superior low temperature properties.

Other pairs of Examples and Comparative Examples, in which the polymer is the same but in which the curing systems differ, further illustrate the invention.

In the paired experiments of Example 2 and Comparative Example E, and Example 3 and Comparative Example F, the peroxy curing system required in the present invention is used. However, only the iodo polymers, required in the present invention, exhibit superior low temperature properties.

In the paired experiments of Example 4 and Comparative Example G, a different VF$_2$/HFP/TFE composition from that of Examples 1 is studied. Here, the same iodo polymer is cured by peroxide vs bisphenol. As found in the earlier examples, the peroxy cured sample exhibits significantly better low temperature properties than the bisphenol cured sample.

We claim:

1. A cured fluoroelastomer composition prepared from
(A) a polymer selected from the groups consisting of
  (1) random copolymer consisting essentially of about 60–80 mole % vinylidene fluoride polymer repeat units, about 14–24 mole % hexafluoropropylene polymer repeat units and about 4–26 mole % tetrafluoroethylene polymer repeat units, and
  (2) a random copolymer consisting essentially of about 46–83 mole % VF$_2$ polymer repeat units, about 12–24 mole % CF$_3$(CF$_2$)$_n$OCF=CF$_2$ polymer repeat units wherein n is 0–5, and up to about 30 mole % tetrafluoroethylene polymer repeat units, wherein at least about 75% of the terminal carbon atoms of copolymer (1) and copolymer (2) have iodine bonded thereto and the iodine comprises about from 0.1 to 0.5 weight percent of the polymer; and
(B) a curing system comprising
  (1) about from 0.5 to 10 parts, per 100 parts of polymer, of a polyfunctional crosslinking agent, and
  (2) about from 0.5 to 10 parts, per 100 parts of polymer of an organic peroxide.

2. A cured fluoroelastomer composition of claim 1 wherein the polyfunctional crosslinking agent consists essentially of triallyl isocyanurate.

3. A cured fluoroelastomer composition of claim 1 wherein the organic peroxide consists essentially of a dialkyl peroxide.

4. A cured fluoroelastomer composition of claim 3 wherein the dialkyl peroxide consists essentially of di-tertiary butyl peroxide.

5. A cured fluoroelastomer composition of claim 3 wherein the organic peroxide consists essentially of 2,5-dimethyl-2,5-di(tertiarybutylperoxy) hexane.

6. A process for the preparation of cured fluoroelastomer comprising blending
(A) a polymer selected from the groups consisting of (1) a copolymer consisting essentially of about 60-80 mole % vinylidene fluoride polymer repeat units, about 14-24 mole % hexafluoropropylene polymer repeat units and about 4-26 mole % tetrafluoroethylene polymer repeat units, and (2) a copolymer consisting essentially of about 46-83 mole % $VF_2$ polymer repeat units, about 12-24 mole % $CF_3(CF_2)_nOCF{=}CF_2$ polymer repeat units wherein n is 0-5, and up to about 30 mole % TFE polymer repeat units, wherein at least about 75% of the terminal carbon atoms of copolymer (1) and copolymer (2) have iodine bonded thereto; and (B) a curing system comprising
(1) about from 0.5 to 10 parts, per 100 parts of polymer, of a polyfunctional crosslinking agent, and
(2) about from 0.5 to 10 parts, per 100 parts of polymer of an organic peroxide; and heating the resulting blend to a temperature of about from 150° to 200° C. for a period of at least about one minute.

7. A process of claim 6 wherein the blend is heated for a period of about from 1 to 30 minutes.

8. A process of claim 6 wherein the blend is heated to a temperature of about from 160° to 180° C.

* * * * *